Feb. 16, 1937.    V. TINGHIR    2,070,698
AUTOMOBILE REVERSE BRAKE MECHANISM
Filed Sept. 12, 1935
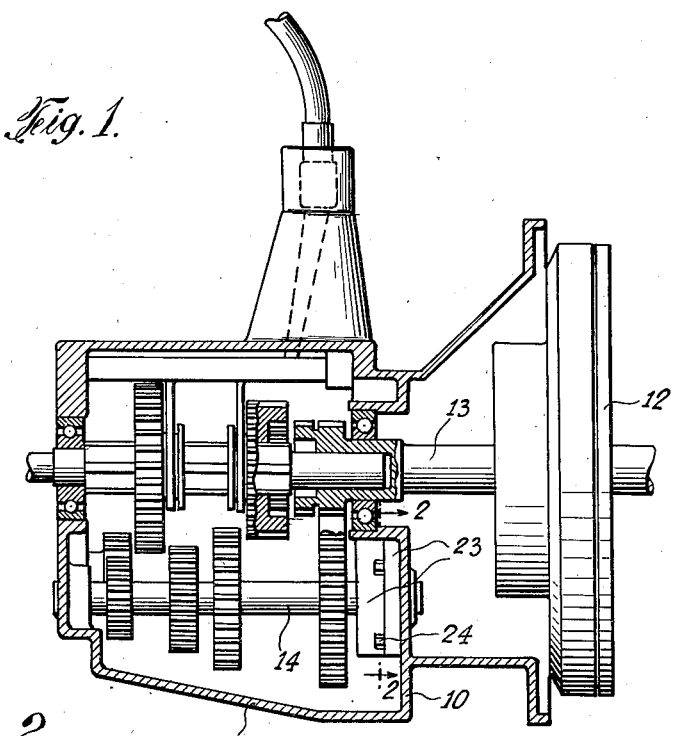
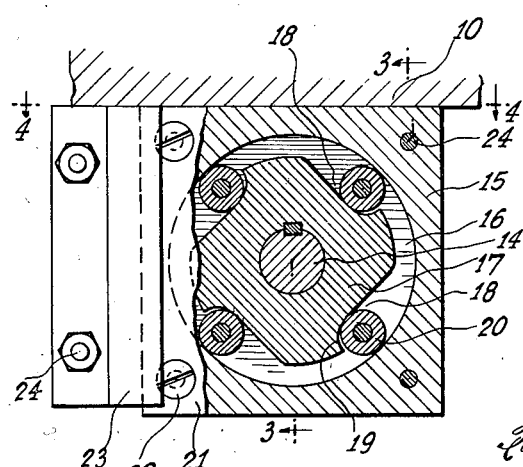
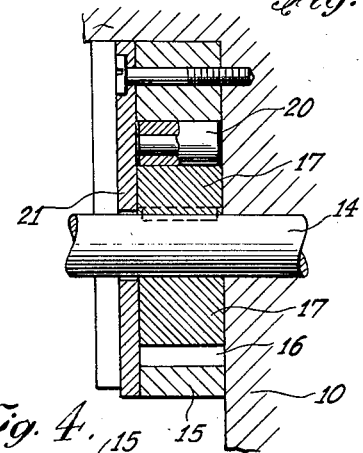
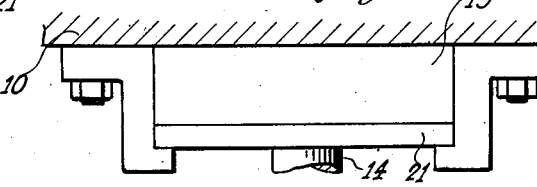
INVENTOR
*Vahe Tinghir*
BY *J. Ledermann*
ATTORNEY Patented Feb. 16, 1937

2,070,698

UNITED STATES PATENT OFFICE 2,070,698

AUTOMOBILE REVERSE BRAKE MECHANISM

Vahe Tinghir, Forest Hills, N. Y.

Application September 12, 1935, Serial No. 40,270

1 Claim. (Cl. 192—4)

One object of this invention is the provision of an improvement in the mechanism of automobiles whereby the vehicle will be prevented from rolling down hill when it has been stopped at a grade sloping downward, so that the attention of the driver need be applied only to the clutch and throttle to be ready to move forward when able to do so.

Another object of the invention is the provision of the same improvement to prevent the vehicle from rolling down a grade in the reverse direction when the vehicle has been brought to a stop on an upgrade.

The above and other objects will become apparent in the description below in which one method of construction which attains the objects desired is set forth in detail, reference being had to the accompanying drawing forming a part of this disclosure.

Referring briefly to the drawing, Figure 1 is a cross-sectional view of the transmission of an automobile with the improvement embodied therein.

Figure 2 is a cross-sectional view taken on the line 2—2 of Figure 1.

Figure 3 is a cross-sectional view taken on the line 3—3 of Figure 2.

Figure 4 is a cross-sectional view taken on the line 4—4 of Figure 2.

Referring in detail to the drawing, the numeral 10 represents one end of the transmission housing 11. The clutch is shown at 12 and the motor shaft at 13. The secondary gear shaft is indicated at 14.

A solid block 15 is rigidly mounted on the housing 11 by any suitable means, and a cylindrical bore 16 is provided therein. A cam 17 is rotatably mounted in the bore 16 by being keyed to the shaft 14 which passes through the center of the bore 16. The cam 17 is provided with a plurality of arcuate cut-outs 18 in its periphery, one end of each cut-out being rounded at 19 to provide a seat for a roller 20. The remaining surface of the cut-out 18 is substantially straight and this surface intersects the circular periphery of the cam 17 in the manner of a chord. Freely mounted in each cut-out 18 is a roller 20.

These rollers 20 are confined on one end by the housing 10 and on the other by a disk 21 secured to the block 15 by bolts 22. The whole device is mounted on the housing by means of clamps 23 and bolts 24.

It is obvious that while the shaft 14 is being rotated in counter-clockwise direction (Figure 2) the rollers 20 will fall into the seats 19 of the cam 17 and will thereupon be freely carried around the outer periphery of the bore 16 by further rotation of the cam. In other words, they will follow freely the rotation of the cam 17 since there is ample clearance between the rollers 20 in this position and the periphery of the bore 16. When the direction of rotation of the shaft 14 is reversed, however, the rollers 20 will travel in the opposite direction with respect to the surface of the cut-outs 18, so that they will become wedged between the ends of these surfaces and the periphery of the bore 16, thus preventing further rotation of the shaft 14 and hence preventing retrogression of the vehicle.

Obviously, modifications in form and structure may be made without departing from the spirit and scope of the invention.

I claim:

In an automobile having propelling means, a transmission gear housing, transmission gears in said housing connected with said propelling means, a secondary shaft having some of said transmission gears thereon, a solid block rigidly mounted within said housing against one end wall of said housing and having a cylindrical bore therein, said secondary shaft passing through the center of said bore and having a cam rigid thereon rotatable within said bore, the peripheral surface of said cam having plurality of spaced apart cut-outs therein, rollers freely mounted in said cut-outs, each of said cut-outs being rounded on one end, the other end being substantially straight and intersecting the peripheral surface of said cam, said rollers when seated in said rounded end of the cut-outs being freely rotatable within said bore when said cam is rotating in one direction, rotation of said cam in the opposite direction causing said rollers to travel toward the opposite ends of said cut-outs and to become wedged between said cut-outs and the periphery of the bore to check further rotation of said cam, said end wall of said housing covering one side of said block and closing said cut-outs on that side of said block, a plate rigid with said housing on the other side of said block and having a central opening through which said secondary shaft passes, said plate covering said other side of said block and closing said cut-outs on said other side, said end wall and said plate confining said rollers longitudinally within said cut-outs.

VAHE TINGHIR.